G. W. MARBLE.
REVERSIBLE HANDLES FOR PERAMBULATORS.
No. 175,477. Patented March 28, 1876.
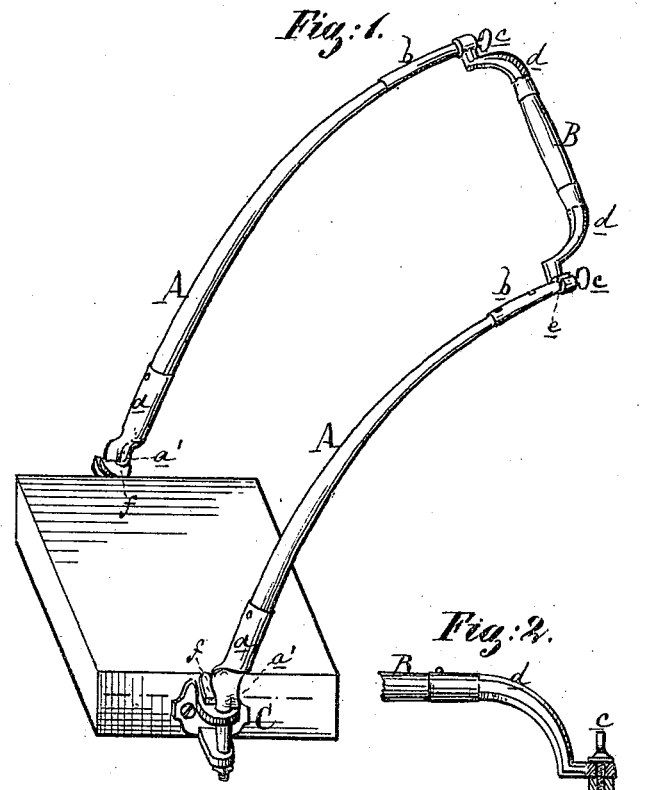
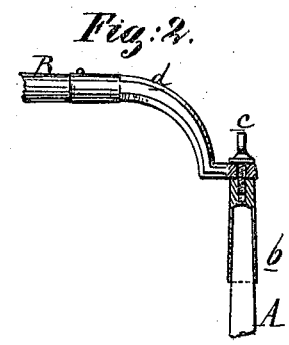
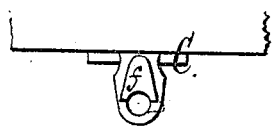
Attest.
Edward Barthel
Charles J. Hunt
Inventor.
G. W. Marble
By Atty
Phil. S. Sprague

UNITED STATES PATENT OFFICE.

GEORGE W. MARBLE, OF CHICAGO, ILLINOIS, ASSIGNOR OF ONE-HALF HIS RIGHT TO ADOLPH SHOENINGER, OF SAME PLACE.

IMPROVEMENT IN REVERSIBLE HANDLES FOR PERAMBULATORS.

Specification forming part of Letters Patent No. 175,477, dated March 28, 1876; application filed February 7, 1876.

*To all whom it may concern:*

Be it known that I, GEORGE W. MARBLE, of Chicago, in the county of Cook and State of Illinois, have invented an Improvement in Reversible Handles for Perambulators, of which the following is a specification:

My invention has for its object to furnish an improved handle for a child's carriage, which handle can be readily reversed without detaching it from the vehicle; and to this end it consists in pivoting the ferrules of the handles in a socket-plate secured to each side of the center of the body of the vehicle, and in so connecting the cross-bar that it can be detached from one handle to allow both to be swung half-way around, thus reversing their position before connecting the two again together.

Figure 1 is a perspective view. Fig. 2 is a sectional elevation, showing the manner of connecting one end of the cross-bar to one of the handles. Fig. 3 is a sectional plan of the same. Fig. 4 is a plan of a socket-plate.

In the drawing, A A represent two curved handles, each terminating at the lower end in a conical socket-ferrule, $a$, fitted with a nut on its screw-threaded extremity. The upper end terminates in a metallic socket-tip, $b$, into the extremity of which is tapped a screw-bolt, $c$, with a thumb-plate on its head. B is the cross-bar, terminating at each end in a curved metallic tip, $d$, one of which tips has a hole drilled through it for the bolt $c$ to pass through, and on which it may swing when freed at the other end, whose tip has an open jaw or slot, $e$, cut in it to embrace the shank of a bolt, $c$, as seen in Fig. 3. When so engaged it may be secured in position by screwing in said bolt. C is a bracket-plate, secured to the middle of the carriage-body at each side. This plate is cast with two brackets, one above the other, with holes drilled through them to receive the ferrule $a$ of the handle, which is secured therein by the nut on its lower end. There is a stop, $a'$, cast on the rear side of the ferrule $a$, and a stop-plate, $f$, on top of the upper bracket, which will allow the handle to swing half-way round, and will then stop it by the stop $a'$ coming into contact with it. The handles can thus be swung or reversed in position, without detaching them from the vehicle, by simply disconnecting the cross-bar and connecting it again to the handles in their new position.

What I claim as my invention is—

The handles A A and cross-bar B, provided with the ferrules $a$, stops $a'$, tips $b$ $d$, and bolts $c$, in combination with the bracket-plates C, all constructed substantially as described, for the purpose specified.

GEORGE W. MARBLE.

Witnesses:
WM. H. LOTZ,
W. HOFFMANN.